(12) United States Patent
Kubo et al.

(10) Patent No.: US 11,513,105 B2
(45) Date of Patent: Nov. 29, 2022

(54) COMPOSITION ESTIMATING APPARATUS AND METHOD (71) Applicant: JEOL Ltd., Tokyo (JP)

(72) Inventors: Ayumi Kubo, Tokyo (JP); Masaaki Ubukata, Tokyo (JP)

(73) Assignee: JEOL Ltd., Tokyo (JP)

( * ) Notice: Subject to any disclaimer, the term of this patent is extended or adjusted under 35 U.S.C. 154(b) by 280 days.

(21) Appl. No.: 16/894,127

(22) Filed: Jun. 5, 2020

(65) Prior Publication Data
US 2020/0386726 A1  Dec. 10, 2020

(30) Foreign Application Priority Data

Jun. 10, 2019  (JP) .............................. JP2019-107778

(51) Int. Cl.
*G01N 30/72* (2006.01)
*H01J 49/00* (2006.01)

(52) U.S. Cl.
CPC ......... *G01N 30/7206* (2013.01); *G01N 30/72* (2013.01); *H01J 49/0036* (2013.01)

(58) Field of Classification Search
CPC .. G01N 30/7206; G01N 30/72; H01J 49/0036
See application file for complete search history.

(56) References Cited

U.S. PATENT DOCUMENTS

| | | | |
|---|---|---|---|
| 3,984,692 A | 10/1976 | Arsenault | |
| 2007/0187588 A1* | 8/2007 | Yoshinari | H01J 49/004 |
| | | | 250/288 |
| 2008/0067344 A1 | 3/2008 | Yamaguchi et al. | |
| 2008/0121793 A1 | 5/2008 | Yamaguchi et al. | |
| 2013/0306857 A1 | 11/2013 | Yamaguchi | |

FOREIGN PATENT DOCUMENTS

| | | |
|---|---|---|
| JP | 2005221250 A | 8/2005 |
| JP | 2007287531 A | 11/2007 |
| JP | 2013190216 A | 9/2013 |
| WO | 2006049064 A1 | 5/2006 |
| WO | 2012104956 A1 | 9/2012 |

OTHER PUBLICATIONS

Extended European Search Report issued in EP20177587.1 dated Oct. 13, 2020.
Office Action issued in JP2019-107778 dated Jul. 27, 2021.
Inohana et al., Development of a unique software tool to predict empirical formulae utilizing accurate mass MS measurements, Chromatography, vol. 27, No. 2, 2006, pp. 73-79.

* cited by examiner

*Primary Examiner* — Randy W Gibson
*Assistant Examiner* — John M Royston
(74) *Attorney, Agent, or Firm* — The Webb Law Firm (57) ABSTRACT

A composition of a focused portion corresponding to a portion of a molecular ion is estimated as a partial composition based on a mass of the focused portion. An initial composition search range is modified based on the partial composition. A composition of the molecular ion is estimated as an overall composition based on a mass of the molecular ion under a modified composition search range. A way of modifying the composition search range may include a method for modifying a lower limit to a range of the number of atoms and a method for adding a new range of the number of atoms associated with a new chemical element.

11 Claims, 10 Drawing Sheets

COMPOSITION ESTIMATING APPARATUS AND METHOD

CROSS REFERENCE TO RELATED APPLICATION

This application claims priority to Japanese Patent Application No. 2019-107778 filed Jun. 10, 2019, the disclosure of which is hereby incorporated by reference in its entirety.

BACKGROUND

Field of the Disclosure

This disclosure relates to a composition estimating apparatus and method, and more particularly to a modification of a composition estimating condition.

Description of Related Art

A mass spectroscopy system includes, for example, a gas chromatograph apparatus, a mass spectrometer, and an information processing device. In general, the information processing device controls operations of the gas chromatograph apparatus and the mass spectrometer, and processes data obtained by mass spectroscopy. Typically, the information processing device functions as a mass spectrum processor. The information processing device may be incorporated in the mass spectrometer. In the mass spectrum processor, a chemical composition of a molecular ion is estimated from a mass (accurate mass) corresponding to a molecular ion peak. In this respect, the mass spectrum processor is considered a composition estimating apparatus.

The mass spectrometer includes an ion source that ionizes compounds contained in a sample. Various types of ion sources are provided in accordance with various types of ionization. For example, Electron Ionization (EI) is known as a hard ionization method. EI facilitates fragmentation of molecular ions, which makes it difficult to observe molecular ions, while making it easy to observe fragment ions (actually, a plurality of types of fragment ions having different mass-to-charge ratios (m/z)). Meanwhile, Field Ionization (FI), Chemical Ionization (CI), Field Desorption Ionization (FD), and Photoionization (PI), for example, are known as soft ionization methods. These soft ionization techniques cause little or no fragmentation of molecular ions.

A mass difference, which is an m/z difference, to be accurate, between a fragment ion and a molecular ion, is referred to as a neutral loss. It is possible to estimate, based on the neutral loss, a composition of a portion that is desorbed from the molecular ion. For example, WO 2006/049064 discloses a technique to estimate a composition, yet fails to disclose any technique to modify a condition for estimating the composition of a molecular ion.

Prior to estimating the composition of a molecular ion, a composition estimating condition is defined. For the composition estimating condition, typically, a user specifies a composition search range. The composition search range is defined by means of an element range (a range of chemical elements) and a range of the number of atoms (for each of the chemical elements). When the composition search range is excessively broad, a multiplicity of compositions are estimated, which causes the user to experience difficulty in identifying a true composition. On the other hand, an excessively narrow composition search range increases a possibility that the true composition cannot be estimated.

Manually determining a suitable composition estimating condition requires a great deal of experience of a user. It is not always easy even for users having extensive experience to specify the suitable composition estimating condition. In a mass spectroscopy system including a gas chromatograph apparatus, a mass spectrometer, and an information processing device, a plurality of mass spectra corresponding to a plurality of compounds are obtained in succession. Requiring user operation to specify the composition estimating condition for each of the mass spectra would put an enormous load on the user.

It is an object of the present disclosure to enable determination of a suitable composition estimating condition when a composition is estimated. It is another object of the present disclosure to lighten workload of a user associated with the operation to specify the composition estimating condition.

SUMMARY

A composition estimating apparatus according to an aspect of this disclosure includes a partial composition estimating unit that estimates, as a partial composition, a composition of a focused portion corresponding to a portion of a molecular ion based on a mass of the focused portion; a modification unit that modifies, based on the partial composition, an initial composition estimating condition to thereby define a modified composition estimating condition; and an overall composition estimating unit that estimates, as an overall composition, a composition of the molecular ion based on a mass of the molecular ion under the modified composition estimating condition.

In the above described configuration, the initial composition estimating condition is modified based on the composition (the partial composition) estimated with respect to the portion of the molecular ion. According to this configuration, for example, the composition estimating condition can be appropriately narrowed, or appropriately broadened. In other words, it is possible to improve or optimize the composition estimating condition. The initial composition estimating condition is a composition estimating condition which is not yet modified, and which is specified by a user in an embodiment. The above-described partial composition estimating unit, the modification unit, and the overall composition estimating unit are implemented, in an embodiment, by a processor configured to execute programs.

In one embodiment, the initial composition estimating condition is an initial composition search range defined by a plurality of ranges of the number of atoms in connection with a plurality of chemical elements. In general, the composition estimating condition includes an allowable margin of error in an accurate mass. The composition estimating condition may further include conditions for a charge number, an electron number, and a degree of unsaturation, for example.

In one embodiment, the modification unit has a narrowing function to narrow at least one of the plurality of ranges of the number of atoms based on the partial composition. In the embodiment, the plurality of ranges of the number of atoms are defined using a plurality of lower limits and a plurality of upper limits, and the narrowing function is configured to raise at least one of the plurality of lower limits. In this configuration, one or more lower limits to the plurality of ranges of the number of atoms are based on a presumption that the estimated partial composition is contained in the overall composition.

In one embodiment, the modification unit has an adding function of adding, based on the partial composition, a new chemical element to the plurality of chemical elements and adding a new range of the number of atoms in connection with the new chemical element to the plurality of ranges of the number of atoms. According to this configuration, the initial composition search range can be broadened or optimized in an ex post manner.

In one embodiment, the modification unit includes an extractor that extracts, when a plurality of partial compositions are estimated with respect to the focused portion, a common composition from the plurality of partial compositions, and a range modifying unit that modifies the composition search range based on the common composition. This configuration is based on a premise that the common composition is contained in the overall composition, and can provide an effect that validity or reliability of the modified composition search range is enhanced.

In one embodiment, the modification unit includes an identification unit that identifies, when a plurality of partial compositions are estimated with respect to a plurality of focused portions corresponding to a plurality of portions of the molecular ion, the highest number of atoms from the plurality of partial compositions for each of the plurality of chemical elements, and a range modifying unit that modifies the composition search range based on the highest number of atoms for each of the plurality of chemical elements. This configuration is based on a premise that the highest number of atoms for each of the chemical elements is contained in the overall composition, and can provide the effect that validity or reliability of the modified composition search range is enhanced.

In one embodiment, the focused portion is at least one of a fragment ion and a portion corresponding to a difference between the molecular ion and the fragment ion. The portion corresponding to the difference is a portion corresponding to a neutral loss, and may be considered a portion of the molecular ion similar to the fragment ion.

In one embodiment, the composition estimating apparatus further includes a selector that selects, as the focused portion, either the portion corresponding to the difference or the fragment ion based on a molecular ion peak and a fragment ion peak in a mass spectrum. In the selector, a mass of the portion corresponding to the difference may be compared with a mass of the fragment ion, and either one of the portion corresponding to the difference and the fragment ion that is smaller in mass may be selected as the focused portion. According to this configuration, accuracy in estimation of the partial composition can be increased, and in turn, accuracy in estimation of the overall composition can be enhanced. It may be contemplated that both the portion corresponding to the difference and the fragment ion are selected as the focused portion. The selector is implemented, in the embodiment, by the processor.

In one embodiment, the mass spectrum includes a first mass spectrum generated under application of a first ionization method, and a second mass spectrum generated under application of a second ionization method that is different from the first ionization method. In the embodiment, one of the first and second mass spectra enables clear identification of a fragment ion peak, and the other of the first and second mass spectra enables clear identification of a molecular ion peak.

A composition estimating method according to an aspect of this disclosure includes estimating, as a partial composition, a composition of a focused portion corresponding to a portion of a molecular ion based on a mass of the focused portion, modifying an initial composition estimating condition based on the partial composition to thereby define a modified composition estimating condition, and estimating, as an overall composition, a composition of the molecular ion based on the mass of the molecular ion under the modified composition estimating condition.

In an aspect, the composition estimating method may be implemented as a function of hardware or software. When implemented as the function of software, a program designed to execute the composition estimating method is installed via a portable storage medium or a network into an information processing device. The concept of the information processing device may encompass a computer, the composition estimating apparatus, a mass spectrum processor, and a mass spectrometer, for example.

In one embodiment, masses of a plurality of focused portions are identified with respect to a plurality of molecular ions based on a plurality of mass spectra corresponding to a plurality of compounds which are separated from a specimen stepwise, a plurality of partial compositions are estimated based on the masses of the plurality of focused portions, and the initial composition estimating condition is modified stepwise based on the plurality of partial compositions.

BRIEF DESCRIPTION OF DRAWINGS

Embodiments of the present disclosure will be described based on the following figures, wherein.

DESCRIPTION OF THE INVENTION

Embodiments of the disclosure will be described with reference to the drawings.

Figure 1:
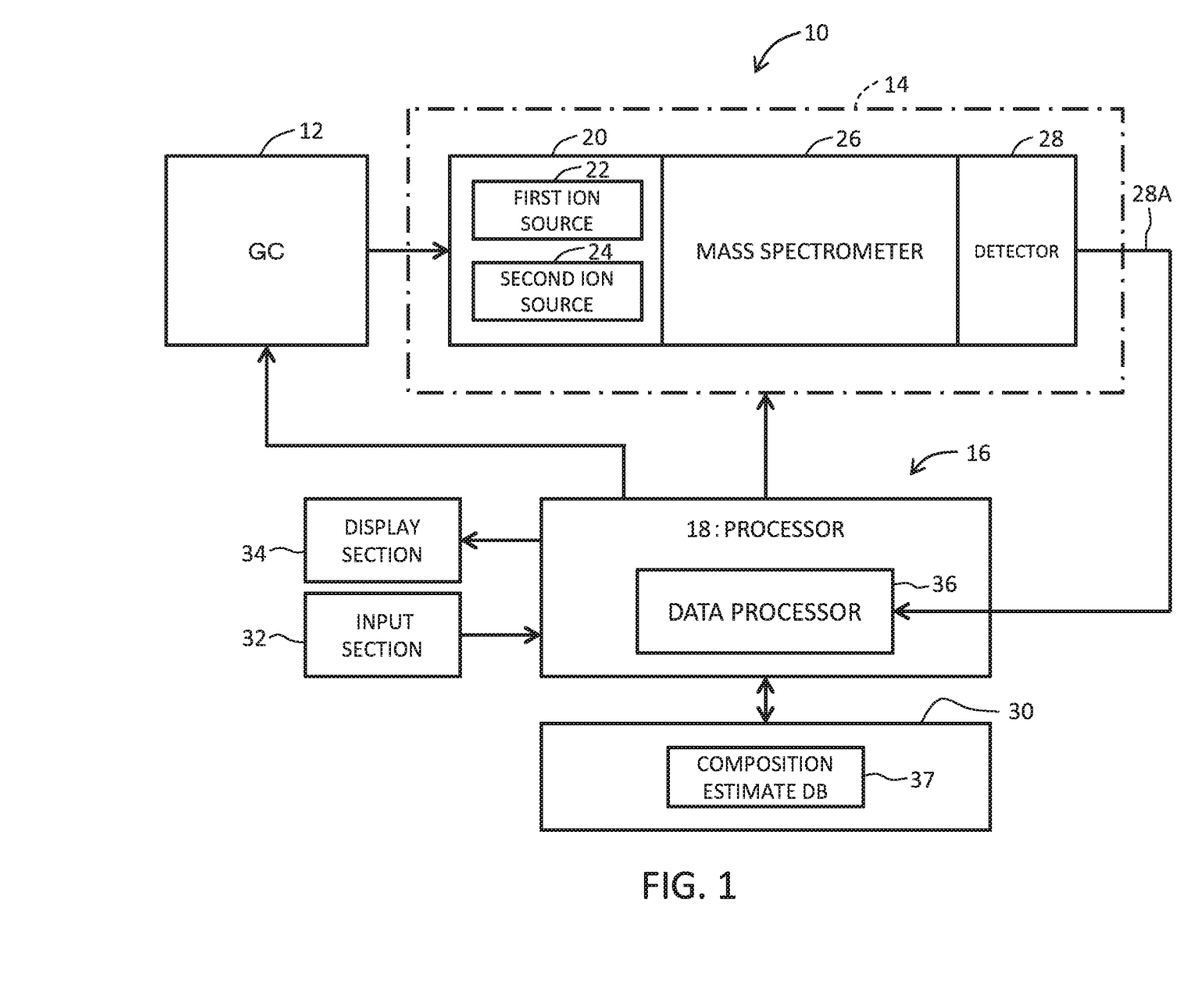
FIG. 1 is a block diagram showing an example structure of a mass spectroscopy system according to an embodiment.

FIG. 1 illustrates an example structure of a mass spectroscopy system according to an embodiment. A mass spectroscopy system 10 separates a plurality of compounds contained in an original sample in terms of time, and then performs mass spectroscopy with respect to the individual compounds in sequence. The mass spectroscopy system 10 as illustrated specifically includes a gas chromatograph apparatus 12, a mass spectrometer 14, and an information processing device 16. The gas chromatograph apparatus 12 may be omitted. In place of the gas chromatograph apparatus 12, a liquid chromatograph apparatus, for example, may be employed.

An original sample supplied to the gas chromatograph apparatus 12 is output as a plurality of compounds that are separated in terms of time. Each of the plurality of compounds is a sample, which is an object to be analyzed, for the mass spectrometer 14. The plurality of separated compounds are sequentially supplied to the mass spectrometer 14. In the illustrated example structure, the mass spectrometer 14 includes an ion source unit 20, a mass spectrometer 26, and a detector 28. In the embodiment, two measurements (component separation and mass spectroscopy) are executed repeatedly with respect to a single original sample. However, it may be the case that only one measurement is conducted, so long as a molecular ion peak and a fragment ion peak can be clearly identified in a mass spectrum.

In the embodiment, the ion source unit 20 includes a first ion source 22 and a second ion source 24 that are selectively used. The first ion source 22 is a hard ion source, which is an ion source based on electron ionization. The first ion source 22 may generate a comparatively great number of fragment ions (which are of different types having different values of m/z).

The second ion source 24 is a soft ion source, which is an ion source based on field ionization. The second ion source 24 is unlikely to generate fragment ions, while being capable of generating molecular ions that can be clearly detected. The second ionization may include, in addition to the field ionization, chemical ionization, field desorption ionization, and photoionization, for example. In the two measurements, the ion source to be actually used is sequentially selected by electrical, mechanical, or manual switching. The order of the ion source to be selected may be determined as desired.

The selected ion source generates ions from the sample supplied thereto. The ions are guided, by the action of electric field, to the mass spectrometer 26. Here, two line mass spectroscopy subsystems may be disposed in parallel to each other. In this case, two ion sources may be operated in parallel, and individual mass spectroscopy subsystems include a mass spectrometer and a detector, as described below.

The mass spectrometer 26 performs mass spectroscopy with respect to an ion based on the mass-to-charge ratio (m/z) of the ion. For example, if the mass spectrometer 26 is a time-of-flight mass spectrometer, individual ions are detected by the detector 28 after time-of-flight in accordance with the mass-to-charge ratios of the ions. Other types of mass spectrometer, including, for example, a magnetic sector mass spectrometer and a quadrupole mass spectrometer, may be used. The detector 28 detects ions, and specifically includes an electron multiplier. The detector 28 outputs a detection signal 28A, which is transmitted to the information processing device 16 via a signal processing circuit which is not shown.

The information processing device 16 includes a processor 18, a memory 30, an input section 32, and a display section 34, for example. The processor 18 is formed of a CPU that executes a program, for example. In place of the processor 18, or in combination with the processor 18, various calculation devices may be used. The information processing device 16 may be formed of a plurality of computers, part of which function over a network.

The processor 18 functions as a calculator, a controller, and a processor. FIG. 1 illustrates data processing function of the processor 18 as a data processor 36. The data processor 36 functions as a partial composition estimating unit, a modification unit, and an overall composition estimating unit, for example. Here, the modification unit includes, for example, an extractor, a range modifying unit, and an identification unit.

The memory 30 includes a semiconductor memory, and a hard disc, for example. The memory 30 stores therein a plurality of programs to be executed by the CPU, the programs including a spectrum processing program and a composition estimating program. A composition estimation database 37 is formed on the memory 30. The composition estimation database 37 may be formed on a storage connected to the information processing device 16 via a network. The composition estimate database 37 contains information which is referenced in order to estimate a molecular ion composition (overall composition), a composition of a portion corresponding to a neutral loss (a partial composition), and a composition of a fragment ion (a partial composition).

The input section 32 is formed of a keyboard and a pointing device, for example. A user selects a peak and inputs processing conditions, for example, through the input section 32. In the embodiment, the user specifies, through the input section 32, a composition search range as a composition estimating condition. The composition search range specifically includes a plurality of ranges of the number of atoms corresponding to a plurality of chemical elements. Each of the plurality of ranges of the number of atoms is defined using a lower limit and an upper limit. The input composition estimating condition is displayed on the display section 34 which will be described below, and registered in the memory 30. When the composition estimating condition is modified as described below, a modified composition estimating condition is displayed on the display section 34 and registered in the memory 30.

The display section 34 functions as a display, and is specifically formed of a liquid crystal display unit, an organic EL device, or other devices. The display section 34 displays, on its display screen, a chromatogram, a mass spectrum, the composition search range, difference information (such as the neutral loss), and results of a partial composition estimation and an overall composition estimation, for example.

Figure 2:
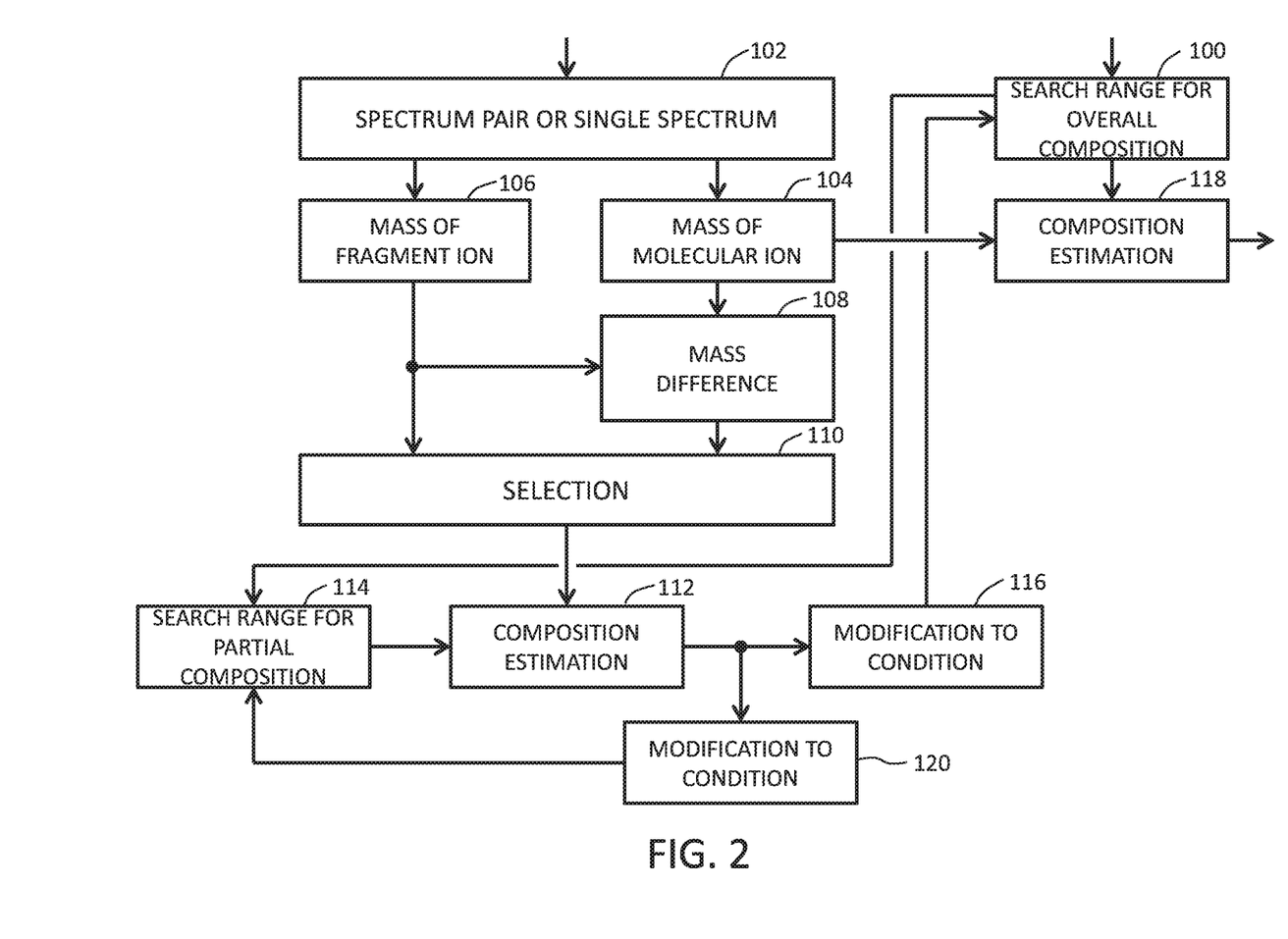
FIG. 2 is a conceptual diagram for explaining a composition estimating method according to an embodiment.

FIG. 2 shows, in a conceptual diagram or a flow chart, a composition estimating method executed by the above-described data processor 36. A process as described below is performed for each of compounds separated in the gas chromatograph apparatus.

Firstly, a molecular ion peak and a fragment ion peak are identified in a spectrum pair or a single spectrum generated through mass spectroscopy (see reference numeral 102). Identification of the peaks is performed manually by a user or automatically. The spectrum pair consists of a first spectrum and a second spectrum, in which the first spectrum is generated under application of a soft ionization method, and the second spectrum is generated under application of a hard ionization method. In place of the spectrum pair, the single spectrum including a clear molecular peak and a clear fragment ion peak may be used. In this case, one of the ionization methods is solely employed. It should be noted that the fragment ion may be generated by means of a collision cell, for example.

Secondly, a mass (accurate mass) of a molecular ion is found based on the molecular ion peak (see reference numeral 104). Concurrently with or subsequently to the finding, the composite estimating condition for the molecular ion is specified, and more particularly the composition search range (overall composition search range) is specified (see reference numeral 100). A composition estimation range is defined by a range of chemical elements and a range of the number of atoms, and more particularly, by a plurality of ranges of the number of atoms associated with a plurality of chemical elements. Each of the ranges of the number of atoms is defined using a lower limit and an upper limit. The composition estimating condition may include a condition for electron number, or a range of an allowable margin of error, for example. The composition estimating condition is specified by the user or specified automatically.

Meanwhile, a mass (accurate mass) of a fragment ion is found based on the fragment ion peak (see reference number 106). A mass difference is obtained by subtracting the mass of the fragment ion from the mass of the molecular ion (see reference numeral 108). The mass difference is also referred to as a neutral loss. Both a portion corresponding to the neutral loss and the fragment ion correspond to portions of the molecular ion.

In the illustrated example, the mass difference is compared with the mass of the fragment ion in order to find and select a smaller one of them (see reference numeral 110). The selection of the smaller one can help enhance accuracy in estimation to estimate a partial composition as described below. However, it is possible that either the mass difference or the mass of the fragment ion is always referenced. Alternatively, both the mass difference and the mass of the fragment ion may be always referenced. A plurality of mass differences and/or masses of a plurality of fragment ions may be referenced.

A composition of a focused portion (which is either the fragment ion or a portion corresponding to the neutral loss) is estimated; i.e., a partial composition is estimated based on a selected mass (see reference numeral 112). In an estimation of a composition corresponding to the neutral loss, zero is defined as the charge number. In the illustrated example, a composition search range for a focused portion (a partial composition search range) is determined based on the composition search range for a molecular ion (the overall composition search range) (see reference numeral 114). In the embodiment, the overall composition search range is also used as the partial composition search range. The partial composition search range is determined by modifying the overall composition search range (for example, by adding a chemical element) as needed. In the determined partial composition search range, the composition of the focused portion is estimated based on the mass of the focused portion (see reference numeral 112). The partial composition search range may be modified depending on a result of the estimation, for example, when resulting estimation has a low degree of likelihood of being accurate (see reference numeral 120).

The overall composition search range is modified based on the composition of the focused portion obtained as described above (see reference numeral 116). For example, one or more lower limits to the ranges of the number of atoms are raised, or a new chemical element is additionally included in the overall composition search range (in other words, a new range of the number of atoms is added). In this way, the overall composition search range is improved or optimized. The composition of the molecular ion is estimated based on the mass of the molecular ion in the modified overall composition estimation range (see reference numeral 118). Because the overall composition can be estimated in the improved or suitable overall composition estimation range, the resulting composition estimation can have an increased degree of reliability.

In an embodiment, a series of operations as described above are performed stepwise on each of a plurality of compounds which are separated in a stepwise manner. In this case, an initial overall composition search range is commonly used for the plurality of compounds. Even through the common use of the search range, because the overall composition search range is customized for each of the compounds in a stepwise manner, accuracy in estimation of each of the compounds can be improved. In addition, the burden on the user can be greatly reduced.

Hereinafter, the composition estimating method according to embodiments will be described in detail with reference to the drawings starting with FIG. 3.

Figure 3:
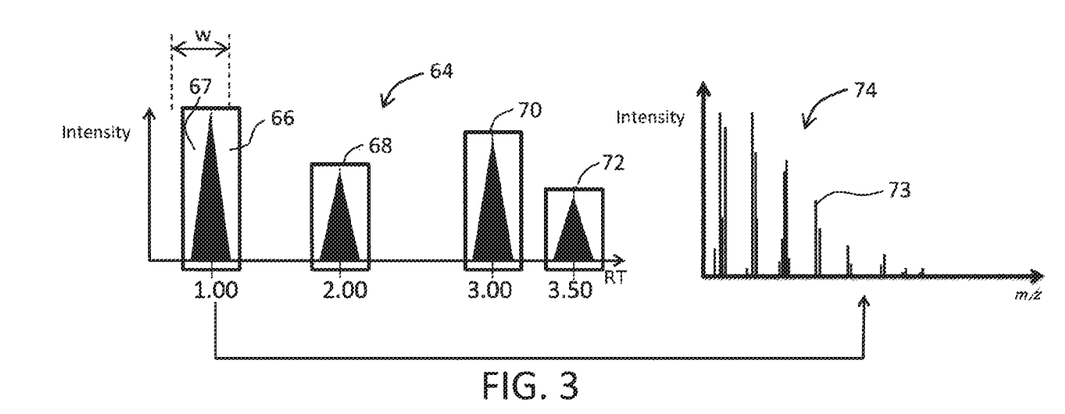
FIG. 3 shows a relationship between a first chromatograph and a first mass spectrum.

FIG. 3 illustrates a first chromatogram 64 generated using the first ion source.

In FIG. 3, the vertical axis indicates the intensity of total ion current (TIC), and the horizontal axis indicates retention time (RT). The first chromatogram 64, as well as a second chromatogram described below, is generated by the data processor 36 illustrated in FIG. 1, based on a detection signal. In the first chromatogram 64, a plurality of compound peaks 67 are generated at different times on the retention time axis. Windows 66, 68, 70, and 72 are set for the plurality of compound peaks 67, respectively, and a mass spectrum is integrated within each of the windows 66, 68, 70, and 72. In the figure, a sign "w" indicates the width of the window 66, which is preset or individually or dynamically set. The data processor 36 illustrated in FIG. 1 generates the mass spectrum repeatedly at a fixed timing on the retention time axis based on the detection signal.

For each of the windows 66, 68, 70, and 72, a plurality of mass spectra observed within the predetermined period are integrated to generate a first mass spectrum. FIG. 3 illustrates a first mass spectrum 74 generated by integrating a plurality of mass spectra observed in the window 66. In the first mass spectrum 74, a molecular ion peak is unclear, whereas a large number of fragment ion peaks appear as indicated by reference numeral 73.

Figure 4:
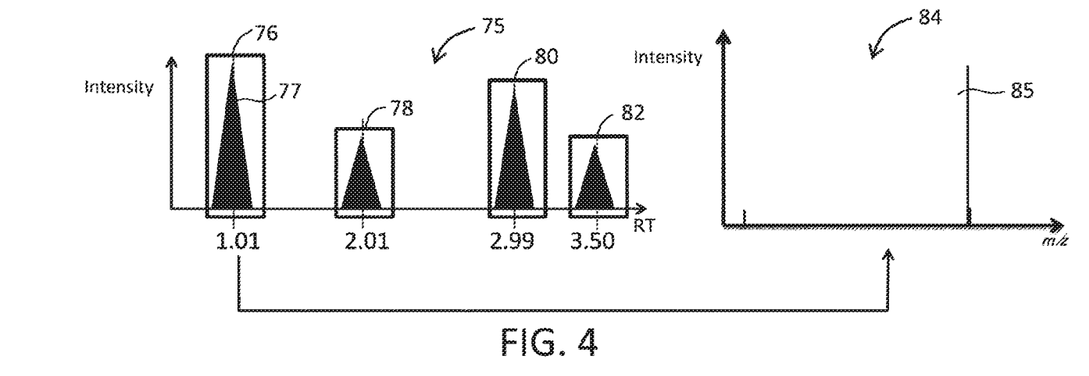
FIG. 4 shows a relationship between a second chromatograph and a second mass spectrum.

FIG. 4 illustrates a second chromatogram 75 generated using the second ion source. Similar to the first chromatogram 64 illustrated in FIG. 3, in the second chromatogram 75, a plurality of compound peaks 77 are generated at different times on the retention time axis and windows 76, 78, 80, and 82 for integration are set for the respective compound peaks. The positions where the plurality of compound peaks 67 and 77 are generated are slightly misaligned between the first chromatogram 64 and the second chromatogram 75 in the retention time axis direction. In an embodiment, in consideration of such a misalignment, correspondence; that is, pairing, of the compound peaks is performed between the first chromatogram 64 and the second chromatogram 75. In this case, a peak in one chromatogram may be used as a reference for setting a search range in the other chromatogram, so that a peak may be searched within the set search range. Alternatively, a method using the center of gravity, a method using waveform fitting, and other methods may be employed.

In the plurality of windows 76, 78, 80 and 82, the mass spectra are integrated to generate a plurality of second mass spectra. FIG. 4 illustrates a second mass spectrum 84 generated by integration of mass spectra within the window 76. In the second mass spectrum 84, fragment ion peaks are hardly identified, whereas a molecular ion peak 85 is clear.

As described above, a mass spectrum pair is generated for each paired peak between the two chromatograms.

Figure 5:
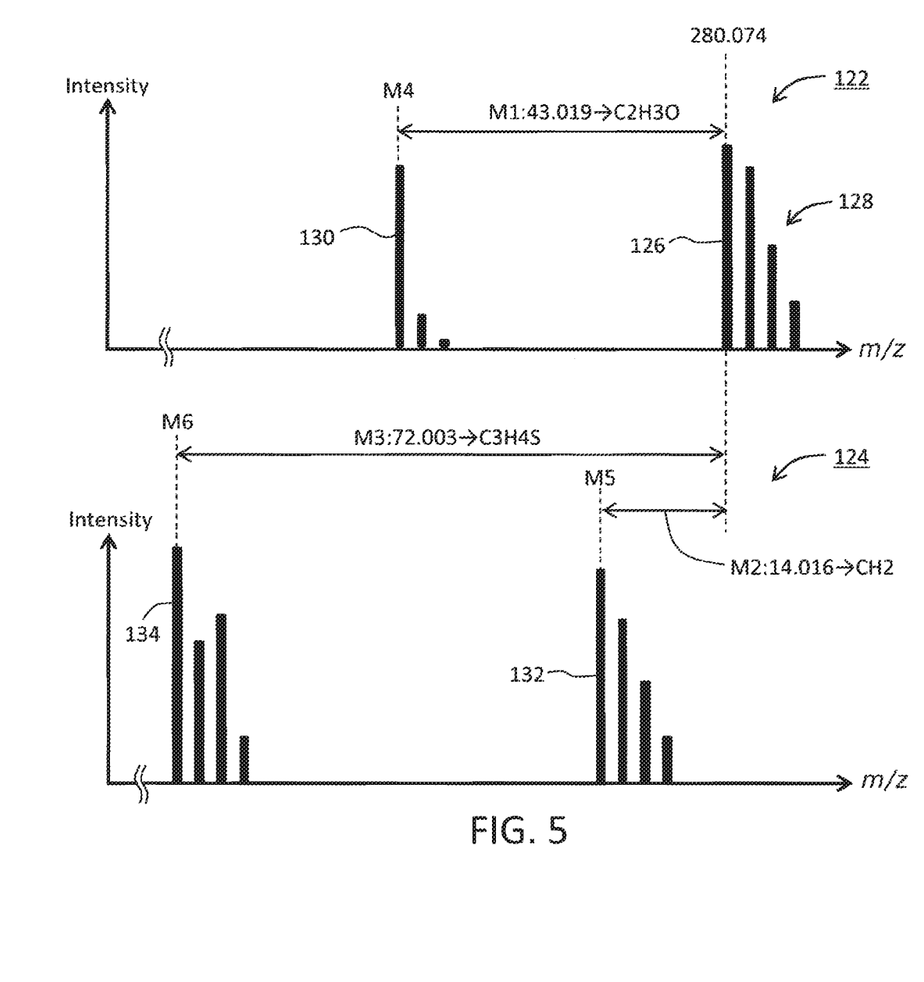
FIG. 5 shows a relationship between the first mass spectrum and the second mass spectrum.

FIG. 5 illustrates another mass spectrum pair. In FIG. 5, a mass spectrum 122 shown on an upper graph includes a clear molecular ion peak 126. In the illustrated example, the mass spectrum 122 also includes a fragment ion peak 130. On the other hand, a mass spectrum 124 shown on a lower graph does not includes any clear molecular ion peak, but includes a plurality of fragment ion peaks 132 and 134. Note that in the mass spectrum 122, an isotopic peak 128 appears in the vicinity of the molecular ion peak.

In an embodiment, the molecular ion peak 126 is identified by a user or identified automatically. Following the identification, a search range is automatically determined with reference to the molecular ion peak 126 and indicated therebelow, and one or more of the fragment ion peaks 130, 132, and 134 are automatically found within the determined search range. The fragment ion peaks 130, 132, and 134 may be specified by the user.

Subsequently, a plurality of mass differences M1, M2, and M3 are automatically calculated based on the molecular ion peak 126 and the fragment ion peaks 130, 132, and 134. Particularly, the mass difference M1 is obtained by subtracting a mass M4 corresponding to the fragment ion peak 130 from a mass corresponding to the molecular ion peak 126. The mass difference M2 is obtained by subtracting a mass M5 corresponding to the fragment ion peak 132 from the mass corresponding to the molecular ion peak 126. The mass difference M3 is obtained by subtracting a mass M6 corresponding to the fragment ion peak 134 from the mass corresponding to the molecular ion peak 126.

In the embodiment, composition estimation based on the mass differences M1, M2, and M3 automatically yields estimated compositions of three portions corresponding to three neutral losses. Specifically, a composition of $C_2H_3O$ is estimated from the mass difference M1, a composition of $CH_2$ is estimated from the mass difference M2, and a composition of $C_3H_4S$ is estimated from the mass difference M3. In this case, the compositions may be estimated from the masses M4, M5, and M6 of the fragment ions. It should be noted that as used herein and in the diagrams, numerals following symbols of chemical elements are expressed with numerical letters of regular size for convenience in writing, and the numeral 1 is omitted as a general rule.

Figure 6:
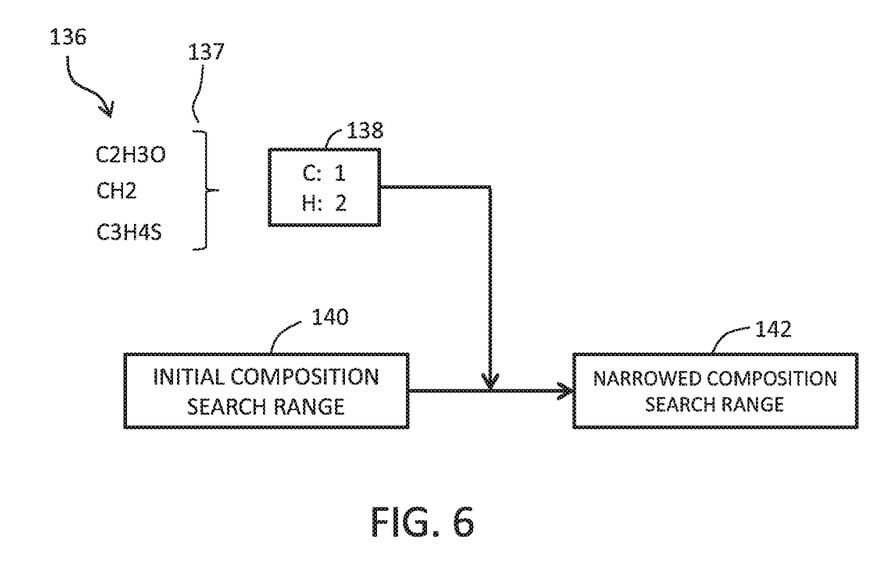
FIG. 6 shows a first example of a method for modifying a composition search range.

FIG. 6 illustrates a method for modifying the composition search range according to a first example. A common composition is automatically extracted (see reference numeral 137) from a plurality of compositions (see reference numeral 136) estimated as described above. Specifically, $CH_2$ is extracted (see reference numeral 138) as a common composition of compositions $C_2H_3O$, $CH_2$, and $C_3H_4S$. The initial composition search range (see reference numeral 140) is modified based on the extracted common composition, to determine a narrowed composition search range (see reference letter 142).

In the first example, on a premise that a plurality of compositions corresponding to a plurality of subtracted masses are estimated, the composition search range is narrowed based on a concept that the common composition is highly likely to be contained in the overall composition. For example, the lower limit to a range of the number of C atoms is raised from 0 to 1, and the lower limit to a range of the number of H atoms is raised from 0 to 2. A composition estimation conducted based on the mass of the molecular ion within the narrowed composition search range can lead to an increased degree of accuracy in the estimation, and in particular, can provide an effect that the number of resulting estimated compositions is reduced. The composition search range may be modified with reference to a single composition which is estimated based on one subtracted mass.

Figure 7:
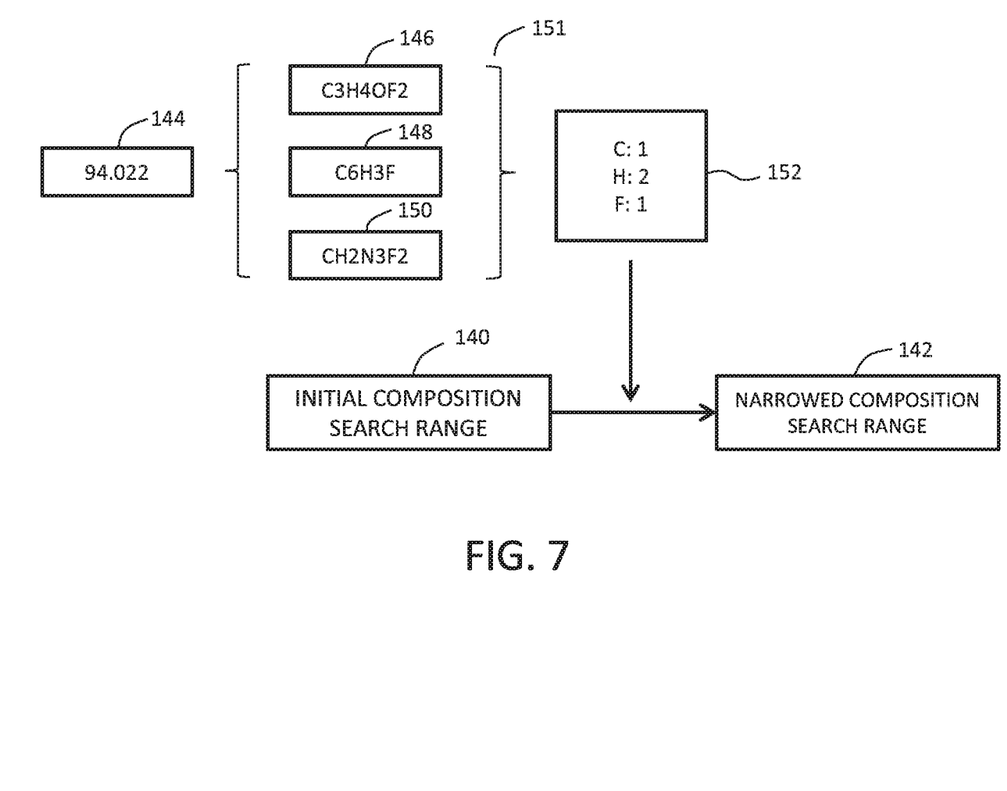
FIG. 7 shows a second example of the method for modifying the composition search range.

FIG. 7 illustrates a second example of the method for modifying the composition search range. After a molecular peak and a fragment peak are identified in a mass spectrum pair, process steps described below are automatically performed. That is, a mass corresponding to the fragment ion peak is subtracted from a mass corresponding to the molecular peak to find a difference between the masses (see reference numeral 144). From the subtracted mass, a plurality of compositions 146, 148, and 150 are estimated. Specifically, in the example illustrated in FIG. 7, three compositions of $C_3H_4OF_2$, $C_6H_3F$, and $CH_2N_3F_2$ are estimated from one subtracted mass. A common composition is extracted from the estimated three compositions (see reference numeral 151). Particularly, $CH_2F$ is extracted (see reference numeral 152).

Subsequently, the initial composition search range (see reference numeral 140) is modified based on the common composition, to thereby determine a narrowed composition search range (see reference numeral 142) as in the case of the first example. For example, the lower limit to the range of the number of C atoms is raised from 0 to 1, the lower limit to the range of the number of H atoms is raised from 0 to 2, and the lower limit to a range of the number of F atoms is raised from 0 to 1. When a composition estimation is performed based on the mass of the molecular ion within the narrowed composition search range, accuracy in the estimation can be improved, and in particular, the number of resulting estimated compositions can be reduced. In the second example, the composition search range is narrowed also based on the concept that the common composition is highly likely to be contained in the overall composition.

Figure 8:
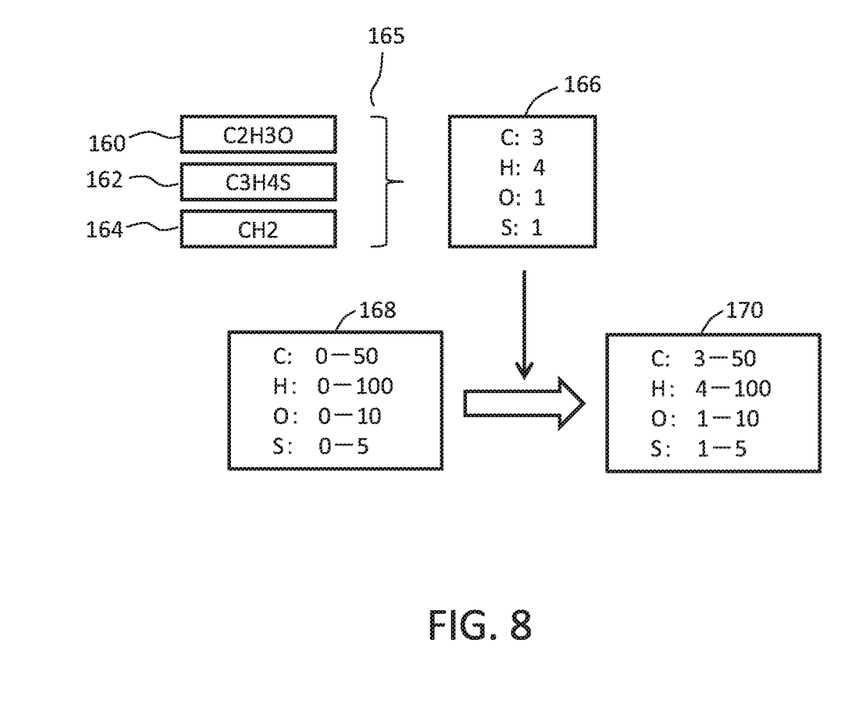
FIG. 8 shows a third example of the method for modifying the composition search range.

FIG. 8 illustrates a third example of the method for modifying the composition search range, and specifically shows a process which is automatically executed after a molecular ion peak and three fragment ion peaks are identified in a mass spectrum pair. Particularly, masses corresponding to the three fragment ion peaks are respectively subtracted from a mass corresponding to the molecular ion peak, to find three differences between the masses. From the subtracted masses, a plurality of compositions 160, 162, and 164 are estimated. Specifically, three compositions of $C_2H_3O$, $C_3H_4S$, and $CH_2$ are estimated. Based on the estimated compositions, a highest number is extracted for each chemical element (see reference numeral 165). Particularly, the highest number 3 is extracted with respect to C, the highest number 4 with respect to H, the highest number 1 with respect to O, and the highest number 1 with respect to S (see reference numeral 166).

Meanwhile, four ranges of the number of atoms corresponding to chemical elements C, H, O, and S are set as the initial composition search range (see reference numeral 168). Specifically, a range of 0-50 is set as the range of the number of C atoms, a range of 0-100 is set as the range of the number of H atoms, a range of 0-10 is set as the range of the number of O atoms, and a range of 0-5 is set as the range of the number of S atoms. In the third example, lower limits to the four ranges of the number of atoms are raised based on the highest numbers of atoms of the four chemical elements. Specifically, the lower limit to the number of C atoms is raised from 0 to 3, the lower limit to the range of the number of H atoms is raised from 0 to 4, the lower limit to the range of the number of O atoms is raised from 0 to 1, and the lower limit to the range of the number of S atoms is raised from 0 to 1 (see reference numeral 170). An upper limit to each of the ranges of the number of atoms is maintained.

Then, a composition estimation performed based on the mass of the molecular ion within the narrowed composition search range can provide an effect that accuracy in estimation is enhanced, and particularly that the number of resulting estimated compositions is reduced. In the third example, the composition search range is narrowed based on a concept that each of the highest numbers is highly likely to be contained in the overall composition.

A fourth example is explained below. In the above-described first to third examples, the composition search range used for estimating the composition of the molecular ion is also used as the composition search range for estimating the composition of the focused portion, while the composition search ranges may not necessarily be the same, and the composition search range for estimating the composition of the focused portion may be generated by broadening the composition search range for estimating the composition of the molecular ion. For example, a new chemical element may be additionally included in the range of chemical elements; i.e., a new range of the number of atoms may be added to the ranges of the number of atoms. Specifically, in the example illustrated in FIG. 8, a new element X may be additionally included, and a range of 0 to 3 may be added as a range of the number of X atoms. With a setting of 0 as the lower limit to the added range of the number of X atoms, a composition including no element X is considered as an object to be estimated, which can circumvent a problem of an excessive limitation on the estimation applied by the addition of element X. It should be noted that, in the examples, when the lower limit associated with element X is changed to have a numerical value other than 0, element X is treated as an indispensable element for the estimation.

Below is described a fifth example which is a modification of the fourth example. Specifically, in the fifth example, the initial composition search range is also used at the start of operation to estimate the composition of a focused portion. Then, in a case where the composition is not estimated appropriately, element X is additionally included (and a range of the number of X atoms is added) as in the case of the previous example. For example, when a target sample to be analyzed is an organic material, the ranges of the number of atoms may be always specified with respect to basic chemical elements C, H, N, and O for the organic material, and one or more ranges of the number of atoms may be added with respect to one or more other chemical elements. Such chemical elements may include B, F, Si, P, S, Cl, Br, I, for example.

Figure 9:
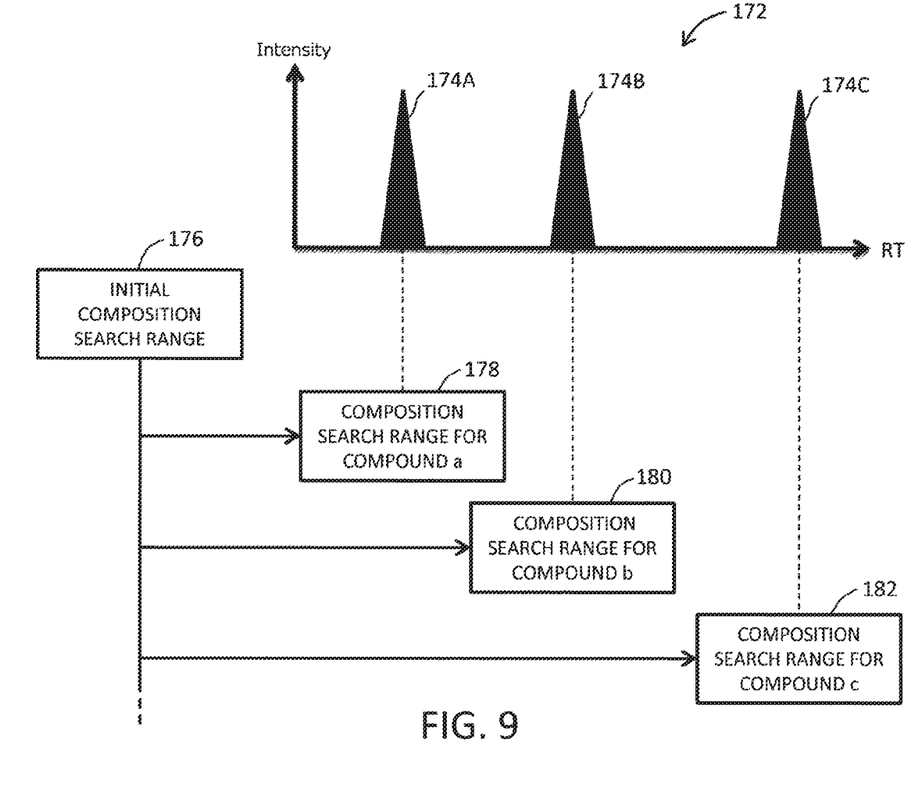
FIG. 9 shows stepwise modifications to a composition estimating condition.

Next, stepwise modifications to the composition search range will be described with reference to FIGS. 9 to 11. In FIG. 9, a chromatogram 172 includes a plurality of peaks 174A, 174B, and 174C of compounds. A mass spectrum corresponding to each of the compounds is analyzed to estimate a composition thereof. During the estimation, a mass of a focused portion is identified based on the mass spectrum obtained for each of the compounds, and an initial composition search range 176 is modified based on compositions estimated from the identified mass. In the illustrated example, the initial composition search range 176 is modified in a stepwise manner, to thereby generate a composition search range 178 for a compound a, a composition search range 180 for a compound b, and a composition search range 182 for a composition c. Such stepwise modifications are automatically performed, which can greatly reduce the user's burden.

Figure 10:
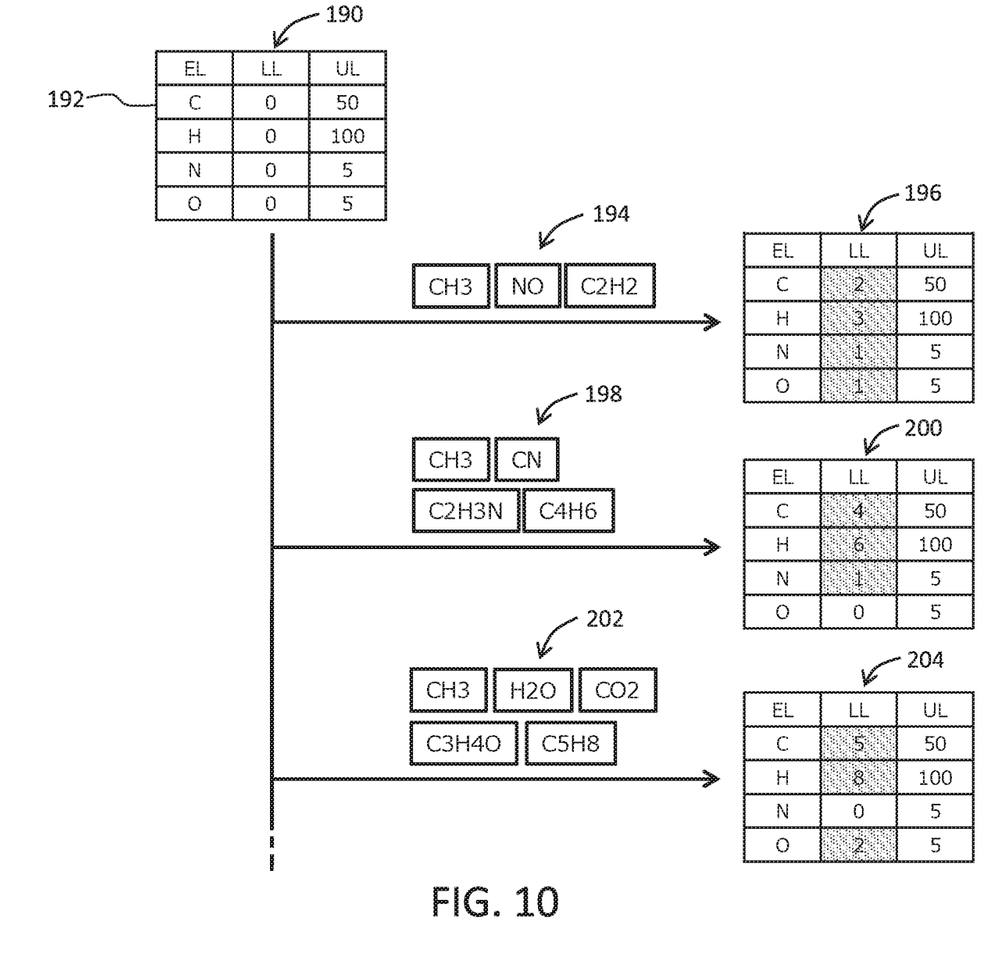
FIG. 10 shows a first example of the stepwise modifications to the composition estimating condition.

FIG. 10 illustrates a first example of the stepwise modifications to the composition search range. An initial composition search range 190 is composed of a plurality of items 192, and each of the plurality of items 192 includes a range (lower and upper limits) of the number of atoms specified for each chemical element. A plurality of partial compositions 194 are estimated based on the mass spectrum obtained for the compound a, and a modified composition search range 196 is generated based on the estimated partial compositions 194. Specifically, the lower limit associated with each of elements C, H, N, and O is modified. Subsequently, a plurality of partial compositions 198 are estimated based on a mass spectrum obtained for the compound b, and a modified composition search range 200 is generated based on the estimated partial compositions 198. Specifically, the lower limits associated with elements C, H, and N are modified, respectively. Further subsequently, a plurality of partial compositions 202 are estimated based on a mass spectrum obtained for the compound c, and a modified composition search range 204 is generated based on the estimated partial compositions 202. Specifically, the lower limits associated with elements C. H, and O are modified, respectively. The modifications to the composition search range as described above are repeated as needed.

Figure 11:
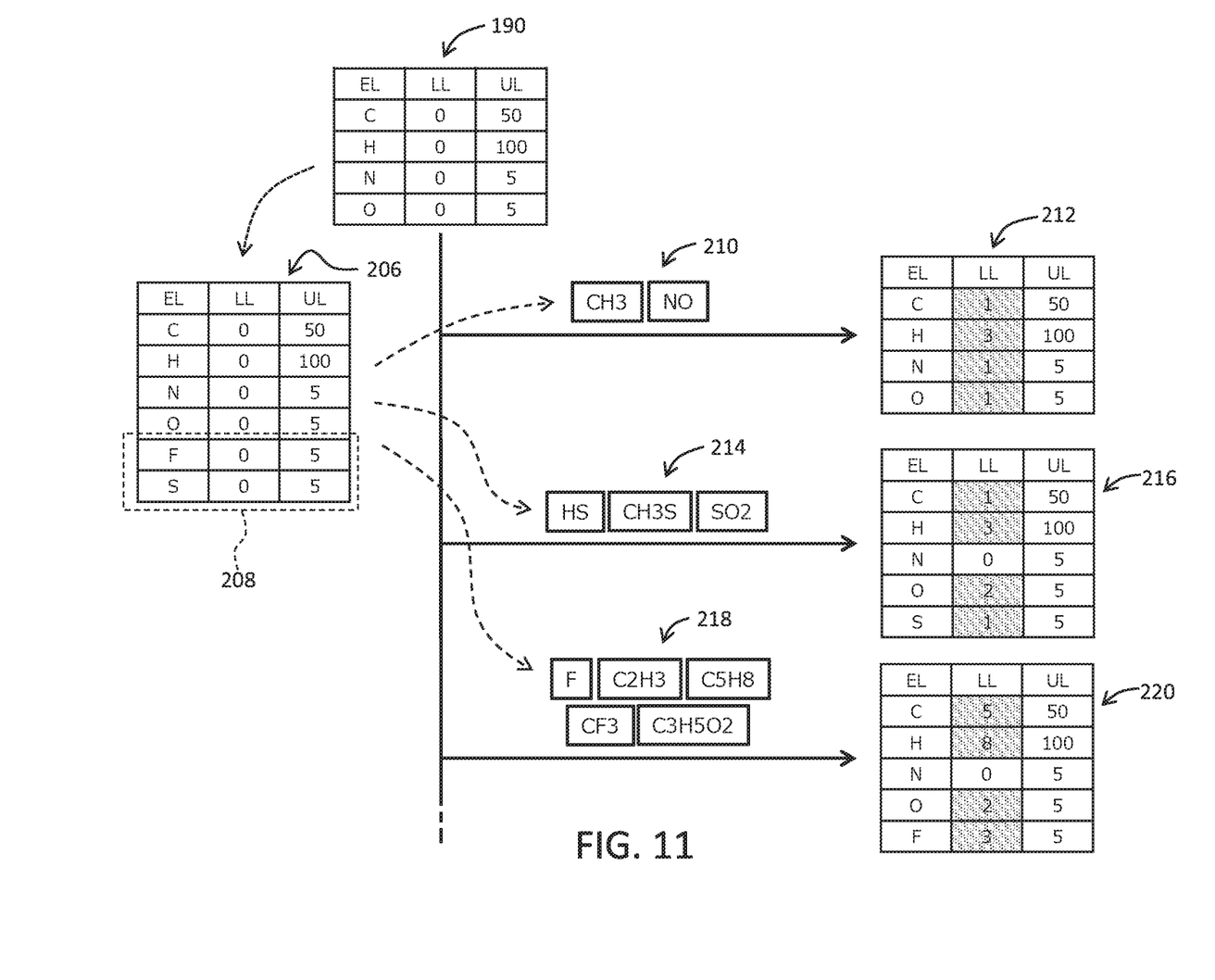
FIG. 11 shows a second example of the stepwise modifications to the composition estimating condition.

FIG. 11 illustrates a second example of the stepwise modifications to the composition search range. The initial composition search range 190 is a composition search range for a molecular ion. A composition search range 206 for a focused portion includes two additional items added in the composition search range 190 (see reference numeral 208). Specifically, a range of the number of F atoms and a range of the number of S atoms are added. As a result of these additions, any modified composition search ranges may contain the ranges of the number of F atoms and the number of S atoms.

A plurality of partial compositions 210 are estimated based on the mass spectrum obtained for the compound a, and a modified composition search range 212 is generated based on the estimated partial compositions 210. Specifically, the lower limits associated with elements C, H, N, and O are modified, respectively. Subsequently, a plurality of partial compositions 214 are estimated based on the mass spectrum obtained for the compound b, and a modified composition search range 216 is generated based on the estimated partial compositions 214. Specifically, the lower limits associated with elements C, H, and O are modified, respectively, and new chemical element S is additionally included along with a range of the number of S atoms. The lower limit to the number of S atoms is specified as 1. Further subsequently, a plurality of partial compositions 218 are estimated based on the mass spectrum obtained for the compound c, and a modified composition search range 220 is generated based on the estimated partial compositions 218. Specifically, the lower limits associated with elements C, H, and O are modified, respectively, and new chemical element F is added along with a range of the number of F atoms. Such a modification to the composition search range is repeated as needed.

In the example illustrated in FIG. 11, the composition search range 206 which is different from the composition search range 190 is employed in the first place. However, it is also possible that the composition of a focused portion is estimated based on the composition search range 190, and if such estimation fails, the composition search range 206 may be employed. In place of the modification to the composition search range based on the common composition, the composition search range may be modified by only adding a chemical element (and a range of the number of atoms).

In all of the above cases, the accuracy in estimation of the composition of a compound can be enhanced by modifying the initial composition search range based on the composition estimated for a focused portion. Further, the stepwise modifications to the initial composition search range can greatly lighten the burden on the user.

While in the above-described embodiments a plurality of ion sources are used, alternatively, a single ion source may be used. While the above description is provided for mostly explaining the examples of estimating the composition based on the mass difference, the composition may alternatively be estimated based on the mass of a fragment ion. The information processing device may be solely used. It may be the case that only one of the narrowing method for raising the lower limit and the broadening method for adding a chemical element is employed. Depending on situations, the method of modification may be automatically selected from among a plurality of modification methods.

The invention claimed is:

1. A composition estimating apparatus, comprising:
a unit that identifies, based on a plurality of mass spectra corresponding to a plurality of compounds which are separated from an original sample in terms of time, a mass of a molecular ion and a mass of a focused portion corresponding to a portion of the molecular ion, for each of the plurality of compounds;
a partial composition estimating unit that estimates, as a partial composition for each of the compounds, a composition of the focused portion based on the mass of the focused portion;
a modification unit that modifies an initial composition estimating condition, which has been commonly used for the plurality of compounds, based on the partial composition, to thereby define a modified composition estimating condition for each of the compounds; and
an overall composition estimating unit that estimates, as an overall composition, a composition of the molecular ion for each of the compounds, based on the mass of the molecular ion under the modified composition estimating condition.

2. The apparatus according to claim 1, wherein
the initial composition estimating condition is an initial composition search range defined by a plurality of ranges of a number of atoms associated with a plurality of chemical elements.

3. The apparatus according to claim 2, wherein
the modification unit has a narrowing function capable of narrowing, based on the partial composition, at least one of the plurality of ranges of the number of atoms.

4. The apparatus according to claim 3, wherein
the plurality of ranges of the number of atoms are specified by a plurality of lower limits and a plurality of upper limits; and
the narrowing function is configured to raise at least one of the plurality of lower limits.

5. The apparatus according to claim 2, wherein
the modification unit has an adding function of adding, based on the partial composition, a new chemical element to the plurality of chemical elements and adding a new range of the number of atoms associated with the new chemical element to the plurality of ranges of the number of atoms.

6. The apparatus according to claim 2, wherein
the modification unit comprises:
an extractor that extracts, when a plurality of partial compositions are estimated with respect to the focused portion, a common composition from the plurality of partial compositions; and
a range modifying unit that modifies the composition search range based on the common composition.

7. A composition estimating apparatus, comprising:
a partial composition estimating unit that estimates, as a partial composition, a composition of a focused portion corresponding to a portion of a molecular ion based on a mass of the focused portion;
a modification unit that modifies an initial composition estimating condition based on the partial composition, to thereby define a modified composition estimating condition; and
an overall composition estimating unit that estimates, as an overall composition, a composition of the molecular ion based on a mass of the molecular ion under the modified composition estimating condition,
wherein
the initial composition estimating condition is an initial composition search range defined by a plurality of ranges of a number of atoms associated with a plurality of chemical elements, and
wherein
the modification unit comprises:
an identification unit that identifies, when a plurality of partial compositions are estimated with respect to a plurality of focused portions corresponding to a plurality of portions of the molecular ion, a highest number of atoms from the plurality of partial compositions for each of the plurality of chemical elements; and
a range modifying unit that modifies the composition search range based on the highest number of atoms associated with each of the plurality of chemical elements.

8. The apparatus according to claim 1, wherein
the focused portion is at least one of a fragment ion and a portion corresponding to a difference between the molecular ion and the fragment ion.

9. The apparatus according to claim 8, further comprising:
a selector that selects, as the focused portion, either the portion corresponding to the difference or the fragment ion based on a molecular ion peak and a fragment ion peak in a mass spectrum.

10. The apparatus according to claim 8, wherein
the mass spectrum comprises a first mass spectrum generated under application of a first ionization method and a second mass spectrum generated under application of a second ionization method that is different from the first ionization method.

11. A composition estimating method, comprising:
identifying with a unit that identifies a mass of a molecular ion and a mass of a focused portion corresponding to a portion of the molecular ion for each of a plurality of compounds based on a plurality of mass spectra corresponding to the plurality of compounds which are separated from an original sample in terms of time;
estimating with a partial composition estimating unit, as a partial composition for each of the compounds, a composition of the focused portion based on the mass of the focused portion;
modifying with a modification unit an initial composition estimating condition which has been commonly used for the plurality of compounds, based on the partial composition, to thereby define a modified composition estimating condition for each of the compounds; and
estimating with an overall composition estimating unit, as an overall composition, a composition of the molecular ion for each of the compounds, based on the mass of the molecular ion under the modified composition estimating condition.

* * * * *